United States Patent
Berger et al.

(10) Patent No.: US 11,299,099 B2
(45) Date of Patent: Apr. 12, 2022

(54) ADJUSTABLE ASSIST STEP FOR AERODYNAMIC IMPROVEMENT

(71) Applicant: GM GLOBAL TECHNOLOGY OPERATIONS LLC, Detroit, MI (US)

(72) Inventors: Richard A. Berger, Shelby Township, MI (US); Vijaya Sirangu, Shelby Township, MI (US); Joseph M. Polewarczyk, Lake Orion, MI (US); David T. Renke, Macomb, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 190 days.

(21) Appl. No.: 16/793,160

(22) Filed: Feb. 18, 2020

(65) Prior Publication Data
US 2021/0253029 A1  Aug. 19, 2021

(51) Int. Cl.
*B60R 3/02* (2006.01)
*B60R 16/00* (2006.01)
*B60R 3/00* (2006.01)

(52) U.S. Cl.
CPC .............. *B60R 3/02* (2013.01); *B60R 16/005* (2013.01); *B60R 3/002* (2013.01)

(58) Field of Classification Search
CPC .......... B60R 3/02; B60R 3/002; B60R 16/005
USPC ......................................................... 280/166
See application file for complete search history.

(56) References Cited

U.S. PATENT DOCUMENTS

| | | | |
|---|---|---|---|
| 10,011,232 B2 | 7/2018 | Burton | |
| 10,081,302 B1* | 9/2018 | Frederick | B60R 3/02 |
| 2018/0134221 A1* | 5/2018 | Burton | B60R 3/02 |
| 2019/0084630 A1* | 3/2019 | Potvin | B62D 37/02 |
| 2019/0344837 A1* | 11/2019 | Toki | B62D 35/001 |
| 2021/0221449 A1* | 7/2021 | Milani | B60R 3/002 |

* cited by examiner

*Primary Examiner* — Bryan A Evans
(74) *Attorney, Agent, or Firm* — Quinn IP Law (57) ABSTRACT

An assist step assembly includes a linkage assembly including a first linkage member and a second linkage member, an assist step coupled to the linkage assembly and movable from a first assist step position to a second assist step position, an aerodynamic member coupled to the linkage assembly and movable from a first aerodynamic member position to a second aerodynamic member position, a movement mechanism coupled to the aerodynamic member and configured move the aerodynamic member from the first aerodynamic member position to the second aerodynamic member position, and a controller in electronic communication with the movement mechanism, the controller configured to determine an operating condition, determine a position of the assist step based on the operating condition, and generate one or more control signals to move the aerodynamic member from the first aerodynamic member position to the second aerodynamic member position.

19 Claims, 8 Drawing Sheets

ADJUSTABLE ASSIST STEP FOR AERODYNAMIC IMPROVEMENT

INTRODUCTION

The present disclosure relates generally to an adjustable assist step or running board for an automotive vehicle that is deployable to a position to achieve drag reduction and stowable to retain ground clearance.

Running boards or assist steps are longitudinal members extending along at least a portion of the length of an automotive vehicle. The assist step is a fixed member that provides a step to assist the vehicle operator or passenger to ingress or egress the passenger compartment of the vehicle.

SUMMARY

Embodiments according to the present disclosure provide a number of advantages. For example, embodiments according to the present disclosure enable adjustment of all or a portion of a vehicle running board or assist step to a deployed position to reduce drag on the vehicle. In various embodiments, an aerodynamic panel is movably coupled to the assist step and is deployable and stowable depending on vehicle conditions.

In one aspect of the present disclosure, an assist step assembly includes a linkage assembly including a first linkage member and a second linkage member, an assist step coupled to the linkage assembly and movable between a first assist step position and a second assist step position, an aerodynamic member coupled to the linkage assembly and movable between a first aerodynamic member position and a second aerodynamic member position, a movement mechanism coupled to the aerodynamic member and configured to move the aerodynamic member between the first aerodynamic member position and the second aerodynamic member position, and a controller in electronic communication with the movement mechanism, the controller configured to determine an operating condition, determine a position of the assist step based on the operating condition, and generate one or more control signals to move the aerodynamic member between the first aerodynamic member position and the second aerodynamic member position.

In some aspects, the first assist step position is a stowed position and the second assist step position is a passenger assistance position.

In some aspects, in the passenger assistance position, the assist step is oriented horizontally and the assist step is further movable to an aerodynamic position in which the assist step is oriented vertically.

In some aspects, the second linkage member includes a first inboard linkage member and a second inboard linkage member connected in serial such that the first and second inboard linkage members fold and rotate relative to each other to position the assist step in the aerodynamic position.

In some aspects, the linkage assembly further includes a pin extending longitudinally through a portion of each of the first and second inboard linkage members and a rotating member configured to engage with the pin such that rotation of the rotating member in a first direction prevents retraction of the pin from the second inboard linkage member and rotation of the rotating member in a second direction allows retraction of the pin from the second inboard linkage member.

In some aspects, the aerodynamic member is rotatably coupled to the assist step and independently actuatable from the assist step.

In some aspects, the first aerodynamic member position is a stowed position and the second aerodynamic member position is a deployed position and when the aerodynamic member is in the deployed position, the aerodynamic member extends in a vertical plane.

In some aspects, the assist step further includes a recession configured to receive the aerodynamic member when the aerodynamic member is in a stowed position.

In some aspects, the aerodynamic member is linearly actuated between the first aerodynamic member position and the second aerodynamic member position.

In some aspects, the aerodynamic member is coupled to an inboard end of the assist step and is rotatably actuated between the first aerodynamic member position and the second aerodynamic member position.

In another aspect of the present disclosure, an assist step assembly includes a linkage assembly including a first linkage member, a second linkage member oriented parallel to the first linkage member, a first guide member, and a second guide member, an assist step coupled to the linkage assembly and movable between a first assist step position and a second assist step position, an aerodynamic member coupled to the linkage assembly, wherein the aerodynamic member is movable between a first aerodynamic member position and a second aerodynamic member position, a movement mechanism coupled to the aerodynamic member and configured to move the aerodynamic member between the first aerodynamic member position and the second aerodynamic member position, and a controller in electronic communication with the movement mechanism, the controller configured to determine an operating condition, determine a position of the assist step based on the operating condition, and generate one or more control signals to move the aerodynamic member between the first aerodynamic member position and the second aerodynamic member position.

In some aspects, the first assist step position is a stowed position and the second assist step position is a passenger assistance position.

In some aspects, the aerodynamic member is independently actuatable from the assist step.

In some aspects, the first aerodynamic member position is a stowed position and the second aerodynamic member position is a deployed position and when the aerodynamic member is in the deployed position, the aerodynamic member extends in a vertical plane.

In some aspects, the aerodynamic member is positioned inboard of and flush with the linkage assembly when the aerodynamic member is in the stowed position.

In some aspects, the first and second guide members are tracks and the aerodynamic member translates between the stowed position and the deployed position along the first and second guide members.

In some aspects, the assist step assembly further includes a breakaway assembly coupled to the linkage assembly and the assist step, the breakaway assembly including a receiving member coupled to a first end of the assist step, a connection member, and a compressible member, wherein the receiving member includes an edge defining an opening configured to receive a first end of the connection member and a second end of the connection member is coupled to the compressible member, and the connection member is removably coupled to the receiving member.

In another aspect of the present disclosure, a method to control a position of an aerodynamic member of a vehicle includes providing an assist step assembly including a linkage assembly, an assist step coupled to the linkage assembly, and an aerodynamic member coupled to the linkage assembly and independently actuatable from the assist step, providing a controller in electronic communication with the assist step assembly, determining, by the controller, when a vehicle speed is above a predetermined threshold, and when the vehicle speed is above the predetermined threshold, generating, by the controller, a control signal to deploy the aerodynamic member to an aerodynamic position independent of a stowed position of the assist step.

In some aspects, the method is initiated when the assist step is in the stowed position.

In some aspects, the method further includes determining, by the controller, when an obstacle is detected in the path of the vehicle and generating, by the controller, a control signal to retract the aerodynamic member to a stowed position when the obstacle is detected.

BRIEF DESCRIPTION OF THE DRAWINGS

The present disclosure will be described in conjunction with the following figures, wherein like numerals denote like elements.

The foregoing and other features of the present disclosure will become more fully apparent from the following description and appended claims, taken in conjunction with the accompanying drawings. Understanding that these drawings depict only several embodiments in accordance with the disclosure and are not to be considered limiting of its scope, the disclosure will be described with additional specificity and detail through the use of the accompanying drawings. Any dimensions disclosed in the drawings or elsewhere herein are for the purpose of illustration only.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present disclosure. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Certain terminology may be used in the following description for the purpose of reference only, and thus are not intended to be limiting. For example, terms such as "above" and "below" refer to directions in the drawings to which reference is made. Terms such as "front," "back," "left," "right," "rear," and "side" describe the orientation and/or location of portions of the components or elements within a consistent but arbitrary frame of reference which is made clear by reference to the text and the associated drawings describing the components or elements under discussion. Moreover, terms such as "first," "second," "third," and so on may be used to describe separate components. Such terminology may include the words specifically mentioned above, derivatives thereof, and words of similar import.

A running board or assist step for a vehicle can be manipulated and moved to improve vehicle drag and lift, as discussed herein. In various embodiments, all or part of the running board or assist step is deployed to an aerodynamic position to reduce drag. The running board or assist step can also be deployed to a more traditional passenger assistance position to enable a passenger to more easily ingress and egress from a vehicle. The deployment of the step and/or aerodynamic member is, in various embodiments, dependent on the vehicle speed and ground clearance measurements, for example and without limitation. In some embodiments, a fixed position running board or assist step includes a movable aerodynamic member that can be deployed as discussed herein to achieve aerodynamic benefits.

Figure 1:
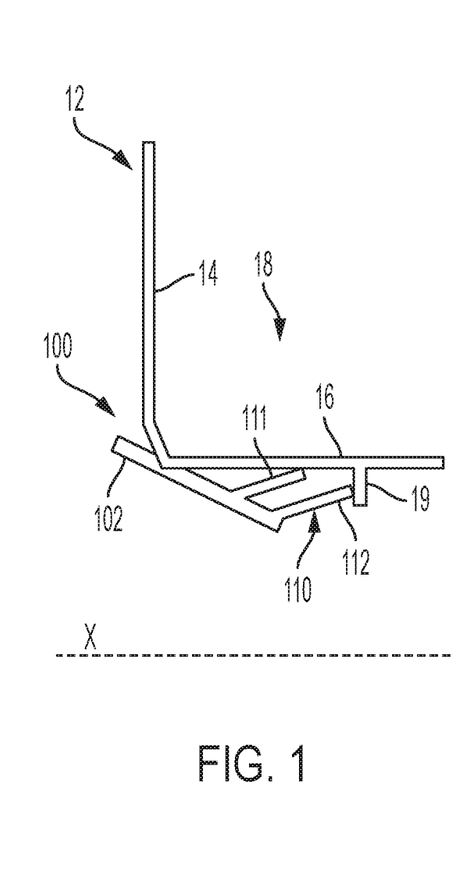
FIG. 1 is a schematic illustration of a partial side view of an automotive vehicle including a movable assist step in a stowed position, according to an embodiment of the disclosure.
Figure 2:
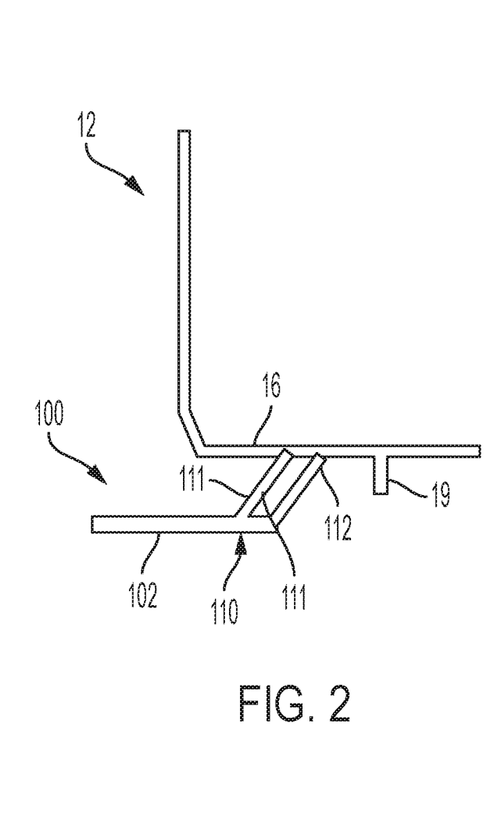
FIG. 2 is a is a schematic illustration of a partial side view of an automotive vehicle including a movable assist step in a passenger assistance position, according to an embodiment of the disclosure.
Figure 3:
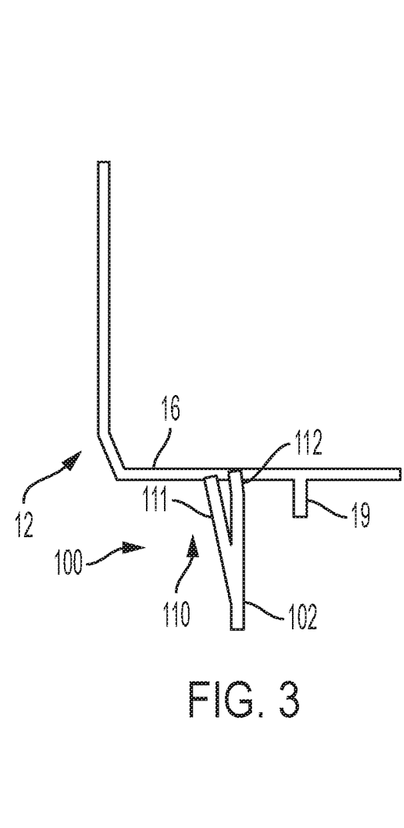
FIG. 3 is a is a schematic illustration of a partial side view of an automotive vehicle including a movable assist step in an aerodynamic position, according to an embodiment of the disclosure.

FIGS. 1-3 illustrate one embodiment of a running board or assist step assembly 100 (hereafter "assist step assembly") in various positions. FIG. 1 illustrates the assist step assembly 100 in a stowed position. FIG. 2 illustrates the assist step assembly 100 in a passenger assistance position. FIG. 3 illustrates the assist step assembly 100 in an aerodynamic position. FIGS. 1-3 schematically illustrate a side view of a vehicle including a vehicle body 12. The vehicle body 12 includes a vertical vehicle frame member 14 and a lateral vehicle frame member 16. For example, in various embodiments, the vertical vehicle frame member 14 is a vehicle door panel or pillar coupled to the lateral vehicle frame member 16 which is a vehicle floor. The vehicle body 12 defines a passenger compartment 18. In various embodiments, the vehicle body 12 defines a lateral axis X of the vehicle extending from one side of the vehicle to the opposite side of the vehicle.

With continued reference to FIGS. 1-3, the assist step assembly 100 includes an assist step 102. The assist step 102 includes a first end and a second end opposite the first end. In a deployed position, as shown in FIG. 2, the first end extends away from the vehicle body 12. The assist step 102 is coupled to the vehicle body 12 via a linkage assembly 110. In various embodiments, the linkage assembly 110 includes a first linkage member 111 and a second linkage member 112. In various embodiments, the first and second linkage members 111, 112 are coupled to the assist step 102 at the second end, that is, the end of the assist step 102 closest to the vehicle body 12. In various embodiments, each of the first and second linkage members 111, 112 are rotatably coupled to the vehicle frame member 16 or the assist step 102 or both. In various embodiments, the first and second linkage members 111, 112 are both movably and rotatably coupled to the vehicle frame member 16 and lateral translational movement of the linkage members 111, 112 is arrested by a stop member 19 coupled to the vehicle frame member 16.

FIG. 1 illustrates the assist step 102 of the assist step assembly 100 in a stowed position. In the stowed position, the assist step 102 is retracted or stowed closer to the vehicle body 12 to maximize ground clearance. FIG. 2 illustrates the assist step 102 in a passenger assistance position. The passenger assistance position is a first deployed position of the assist step 102 in which the assist step 102 extends from the vehicle body 12 in a horizontal position. In the passenger assistance position, the first end of the assist step 102 extends beyond the vehicle body 12 in a lateral direction and is positioned horizontally below the level of the vehicle frame member 16 to provide a lower surface for the passenger to use to assist with ingress and egress from the passenger compartment 18 of the vehicle. FIG. 3 illustrates the assist step 102 in an aerodynamic position. The aerodynamic position is a second deployed position of the assist step 102 in which the assist step 102 is oriented in a vertical direction approximately perpendicular to the lateral axis X of the vehicle body 12. The assist step 102 is configured to rotate relative to the linkage members 111, 112 to provide a vertical extension of the vehicle body 12 towards the ground surface such that ground clearance is minimized and a longitudinal "curtain" is established along at least a portion of the length of the vehicle body 12. A longitudinal "curtain" provides aerodynamic benefits for vehicles traveling at speed such that aerodynamic drag effects due to air turbulence are minimized.

Figure 4:
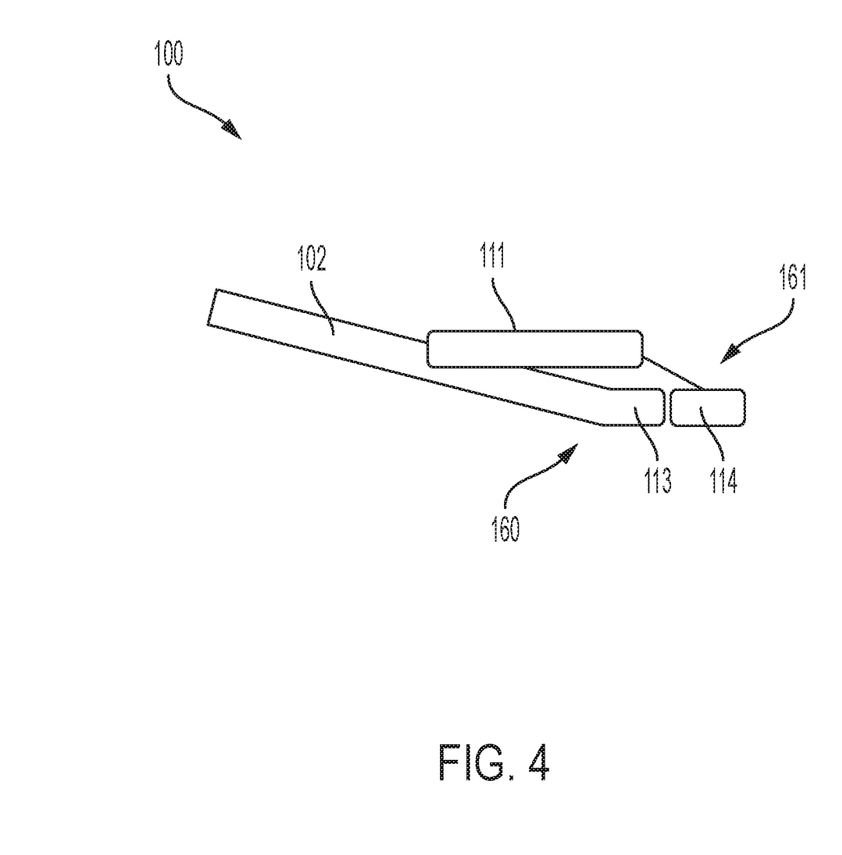
FIG. 4 is a schematic illustration of a partial side view of an automotive vehicle including a movable assist step in a stowed position, according to another embodiment of the disclosure.
Figure 5:
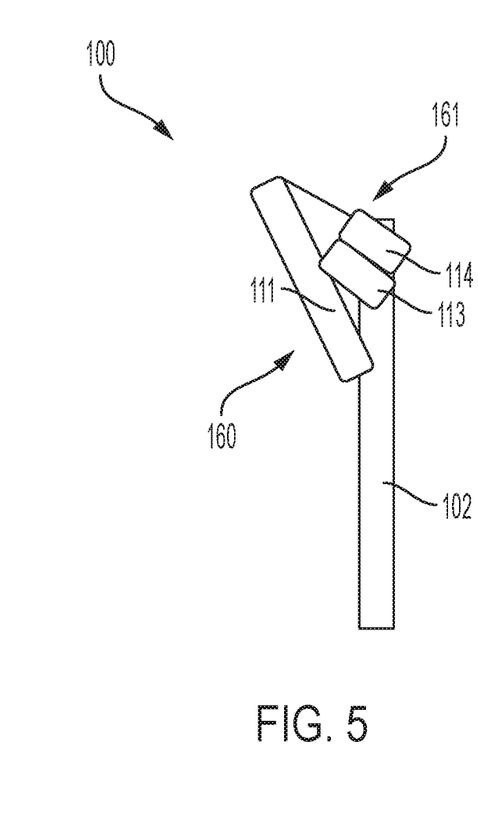
FIG. 5 is a schematic illustration of a partial side view of an automotive vehicle including a movable assist step in an aerodynamic position, according to another embodiment of the disclosure.

FIGS. 4 and 5 illustrate another embodiment of a linkage assembly 160 for the assist step assembly 100. In this embodiment, the linkage assembly 160 includes a first linkage 111, a first inboard linkage member 113, and a second inboard linkage member 114. Together, the first inboard linkage member 113 and the second inboard linkage member 114 form a second, or inboard linkage assembly 161. In the illustrated embodiment, the first inboard linkage member 113 and the second inboard linkage member 114 are connected in serial, or end to end. That is, a second or inboard end of the first inboard linkage member 113 is coupled to a first, or outboard end of the second inboard linkage member 114. When the assist step 102 is in the aerodynamic position, as shown in FIG. 5, the first and second inboard linkages 113, 114 fold and rotate relative to each other.

Figure 6:
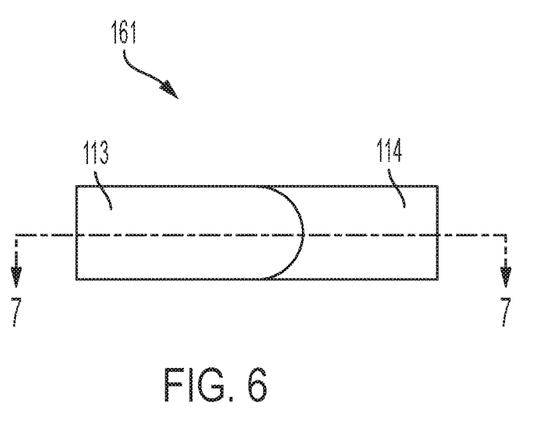
FIG. 6 is a schematic side view illustration of a linkage assembly, according to an embodiment of the disclosure.
Figure 7:
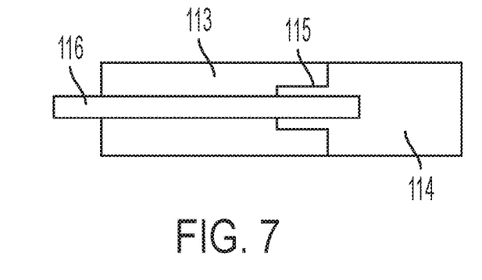
FIG. 7 is a schematic longitudinal section view of the linkage assembly of FIG. 11, according to an embodiment of the disclosure.
Figure 8:
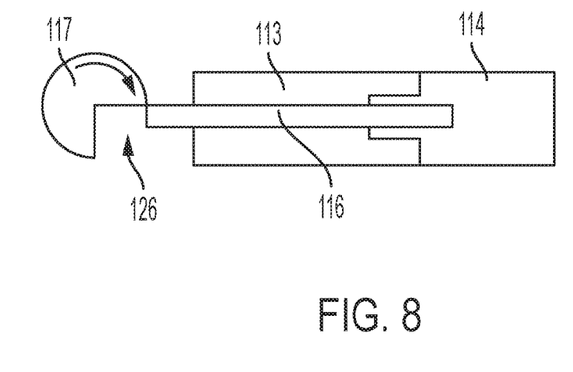
FIG. 8 is a schematic longitudinal section view of a linkage assembly including an interlocking cam member, according to an embodiment of the disclosure.

Details of the linkage assembly 160 are illustrated in FIGS. 6-8. In various embodiments, the first and second inboard linkage members 113, 114 are coupled together at a connection interface 115. The first and second inboard linkage members 113, 114 are coupled together with a pin 116. In various embodiments, the pin 116 is a locking pin. The pin 116 extends longitudinally through at least a portion of each of the first and second inboard linkage members 113, 114. In various embodiments, a first end 126 of the pin 116 extends out of a first end of the first inboard linkage member 113. Extension of the pin 116 through a portion of each of the first and second inboard linkage members 113, 114 prevents relative rotation or folding of the first and second inboard linkage members 113, 114 while the assist step 102 is in the passenger assistance deployment position and the aerodynamic deployment position. When the pin 116 is pulled or removed from the second inboard linkage member 114, in various embodiments, a motor or other mechanical or electrical means folds the linkage assembly 160 as shown in FIG. 5.

With reference to FIG. 8, in various embodiments, the first end 126 of the pin 116 engages with a rotating member or cam 117. As illustrated, clockwise rotation of the cam 117 prevents retraction of the pin 116 from the second inboard linkage member 114, thus preventing undesired folding or rotation of the linkage assembly 160 when the assist step 102 is in one of the deployed positions. Similarly, counterclockwise rotation of the cam 117 allows retraction of the pin 116 from the second inboard linkage member 114 to allow folding or rotation of the linkage assembly 160 when the assist step 102 is moved to the stowed position.

Figure 9:
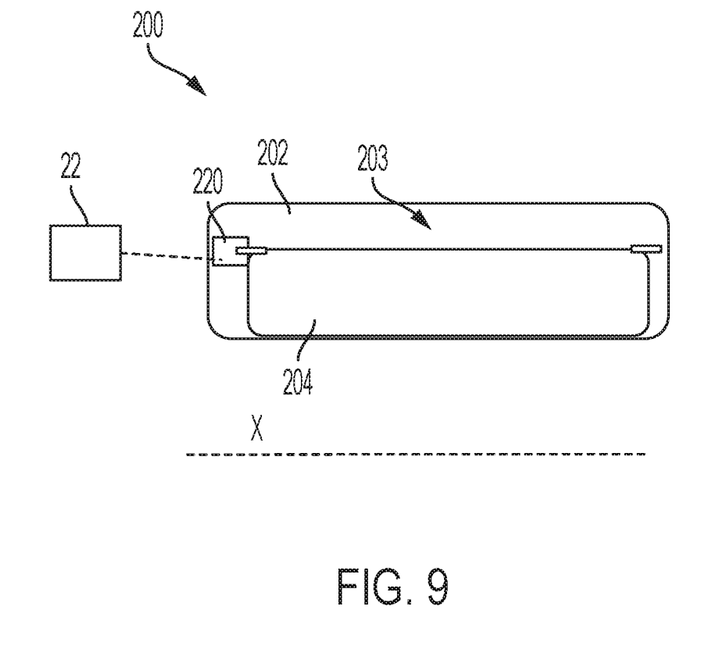
FIG. 9 is a schematic illustration of an underside view of an assist step including a movable aerodynamic member, according to an embodiment of the disclosure.
Figure 10:
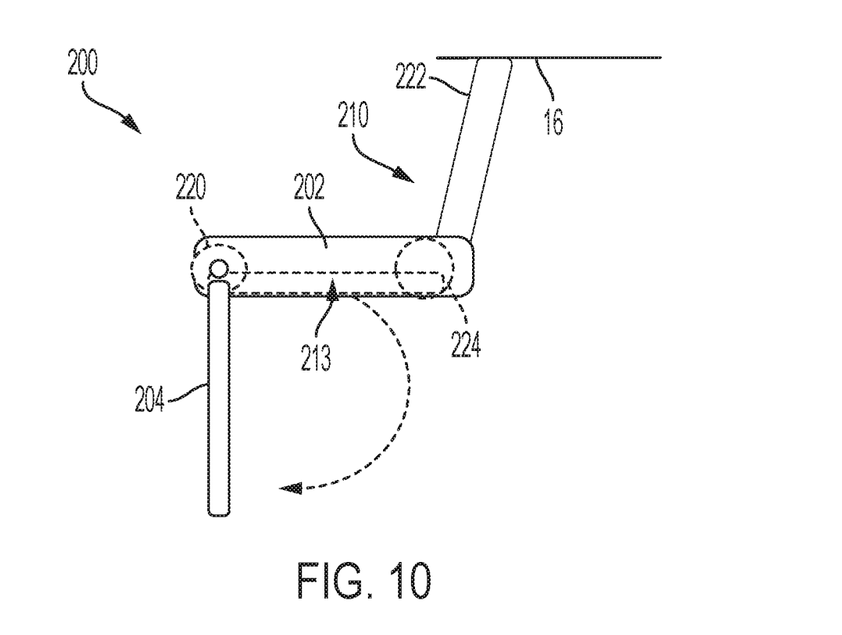
FIG. 10 is a schematic side view illustration of the assist step and moveable aerodynamic member of FIG. 9, shown in a deployed and aerodynamic position, according to an embodiment of the disclosure.

FIGS. 9 and 10 illustrate another embodiment of an assist step assembly 200. The assist step assembly 200 includes an assist step 202, a panel 204, and a movement mechanism 220. The panel 204 is a separate, aerodynamic member that may be deployed to an aerodynamic position or stowed close to an underside surface 203 of the assist step 202. In a stowed position, as shown in FIG. 9, the panel 204 is adjacent to the underside surface 203 of the assist step 202. In various embodiments, as shown in FIG. 10, the underside surface 203 of the assist step 202 includes a channel edge defining a recessed portion 213 configured to receive the panel 204 such that the panel 204 is flush with the underside surface 203 of the assist step 202 when the panel 204 is in the stowed position.

With continued reference to FIGS. 9 and 10, in various embodiments, the assist step 202 is coupled to the vehicle frame member 16 via a linkage assembly, such as the linkage assembly 210. In various embodiments, the linkage 210 is similar to the linkage 110 discussed herein. When the assist step 202 is in the deployed position, as shown in FIG. 10, the panel 204 is deployable to the aerodynamic position. In various embodiments, the panel 204 is deployable to the aerodynamic position when the assist step 202 is in the stowed position. In various embodiments, a movement mechanism 220, which may be a motor or other mechanical or electrical mechanism, actuates or rotates the panel 204 from the stowed position to the aerodynamic position and vice versa via a clockwise rotation about a pivot point at a first or outboard end of the assist step 202, as shown in FIG. 10. In various embodiments, the movement mechanism 220 (e.g., motor) is positioned at a second or inboard end of the assist step 202 at the position 224 such that the panel 204 rotates or pivots about the inboard end of the assist step 202 from the stowed position to the aerodynamic position and vice versa.

In the illustrated embodiments, the panel 204 and the associated movement mechanism 220 are optional or "bolt on" accessories that may be added to the assist step 202 after manufacture of the vehicle. In various embodiments, the panel 204 has different lengths and may have the same length or a different length from the assist step 202. When in the stowed position and received by the recessed portion 213 in the assist step 202, the panel 204 is hidden from view of the customer such that the panel 204 does not affect vehicle styling and is protected from debris.

In various embodiments, the movement mechanism 220 is coupled to at least one controller such as a vehicle controller 22. While depicted as a single unit for illustrative purposes, the controller 22 may additionally include one or more other controllers, collectively referred to as a "controller." The controller 22 may include a microprocessor or central processing unit (CPU) in communication with various types of computer readable storage devices or media. Computer readable storage devices or media may include volatile and nonvolatile storage in read-only memory (ROM), random-access memory (RAM), and keep-alive memory (KAM), for example. KAM is a persistent or non-volatile memory that may be used to store various operating variables while the CPU is powered down. Computer-readable storage devices or media may be implemented using any of a number of known memory devices such as PROMs (programmable read-only memory), EPROMs (electrically PROM), EEPROMs (electrically erasable PROM), flash memory, or any other electric, magnetic, optical, or combination memory devices capable of storing data, some of which represent executable instructions, used by the controller 22 in controlling the connected components.

Figure 11:
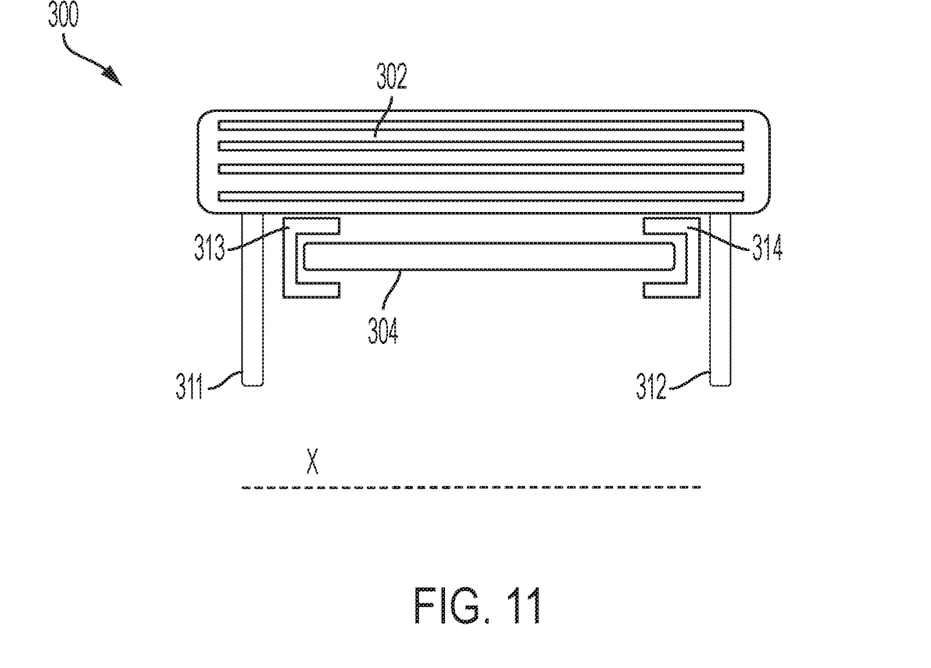
FIG. 11 is a schematic illustration of a top view of an assist step including a movable aerodynamic member, according to another embodiment of the disclosure.
Figure 12:
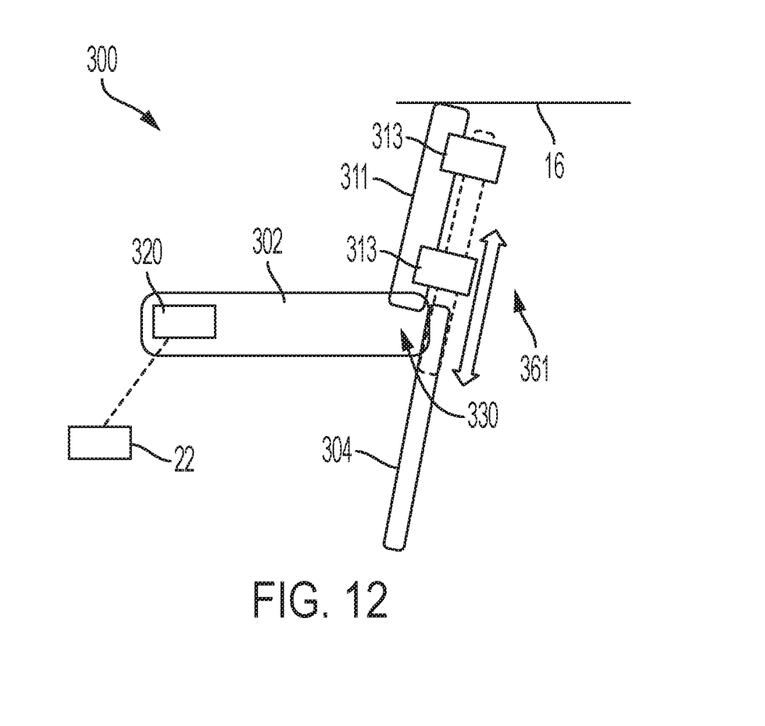
FIG. 12 is a schematic side view illustration of the assist step and movable aerodynamic member of FIG. 11, shown in a deployed and aerodynamic position, according to an embodiment of the disclosure.

FIGS. 11 and 12 illustrate another embodiment of an assist step assembly 300. The assist step assembly 300 includes an assist step 302, a panel 304, and a linkage assembly 361. The assist step 302 is coupled to the vehicle frame member 16 via the linkage assembly 361. In various embodiments, the linkage assembly 361 includes a first linkage 311 and a second linkage 312 oriented parallel to the first linkage 311. The linkage assembly 361 also includes a first guide member 313 and a second guide member 314. The panel 304 is a separate, aerodynamic member that may be deployed to an aerodynamic position or stowed flush with and inboard of the linkage assembly. In various embodiments, the guide members 313, 314 are tracks along which the panel 304 translates between a stowed position and an aerodynamic position.

In the top view of the assist step assembly 300 shown in FIG. 11, the panel 304 is guided along the first and second linkage 311, 312 to the aerodynamic position shown in FIG. 12. The panel 304 moves linearly adjacent to the first and second linkages 311, 312, as shown by the arrow in FIG. 12. When stowed, the panel 304 is protected from debris by the assist step 302. In various embodiments, the assist step 302 is rotatable about a pivot point 330 that coincides with a connection point between the assist step 302 and the first linkage 311. While not shown, the assist step 302 pivots about a second pivot point at the opposite end of the assist step 302 at the connection point between the assist step 302 and the second linkage 312.

In various embodiments, the assist step 302 can rotate both clockwise and counterclockwise, depending on whether the assist step 302 is moving towards the stowed position or an aerodynamic position. In various embodiments, when the assist step 302 is in an aerodynamic position, the panel 304 is also deployed to the aerodynamic position, resulting in aerodynamic feature along the length of the vehicle having a greater length than just the assist step 302 or the panel 304 alone could provide.

With continued reference to FIGS. 11 and 12, in various embodiments, when the assist step 302 is in the deployed position, the panel 304 is deployable to the aerodynamic position. In various embodiments, the panel 304 is deployable to the aerodynamic deployed position when the assist step 302 is in the stowed position. In various embodiments, a movement mechanism 320, which may be a motor or other mechanical or electrical mechanism, translates the panel 304 from the stowed position to the aerodynamic position and vice versa, as shown in FIG. 12. In various embodiments, the movement mechanism 320 is in electronic communication with at least one controller, such as the controller 22.

In the illustrated embodiments, the panel 304 and the associated movement mechanism 320 are optional or "bolt on" accessories that may be added to the assist step 302 after manufacture of the vehicle. In various embodiments, the panel 304 has different lengths and may have the same length or a different length from the assist step 302. When in the stowed position, the panel 304 is hidden from view of the customer such that the panel 304 does not affect vehicle styling and is protected from debris.

Figure 13:
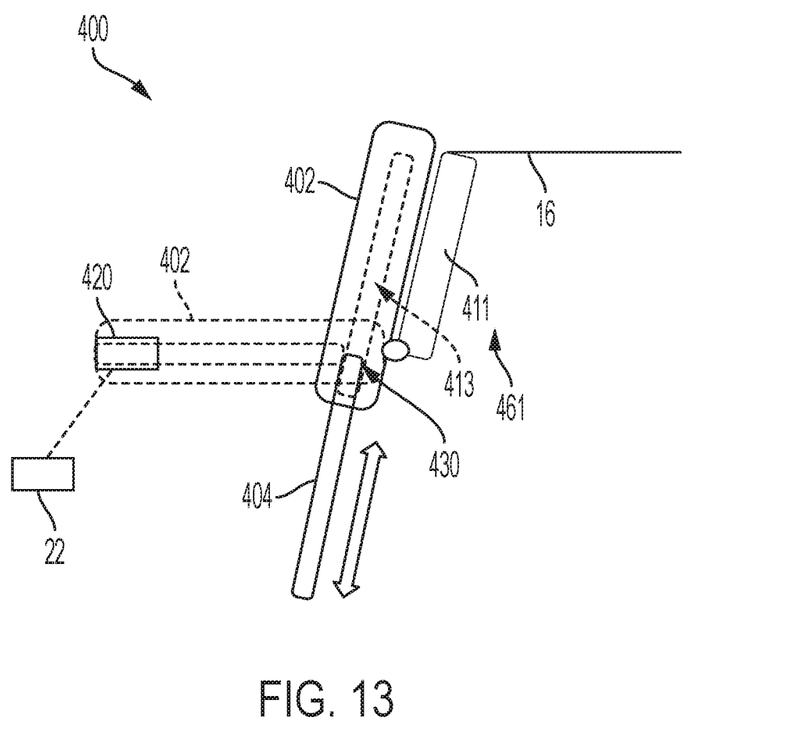
FIG. 13 is a schematic side view illustration of an assist step and movable aerodynamic member, according to another embodiment of the disclosure.

FIG. 13 illustrates another embodiment of an assist step assembly 400. The assist step assembly 400 includes an assist step 402, a panel 404, and a linkage assembly 461. The assist step 402 is coupled to the vehicle frame member 16 via the linkage assembly 461. In various embodiments, the linkage assembly 461 includes a first linkage 411 and a second linkage (not shown) oriented parallel to the first linkage 411. In various embodiments, the linkage assembly 461 is similar to the linkage assembly 361 discussed herein. The panel 404 is a separate, aerodynamic member that may be deployed to an aerodynamic position or stowed within the assist step 402.

In various embodiments, the assist step 402 can rotate both clockwise and counterclockwise, depending on whether the assist step 402 is moving towards the stowed position or a passenger assistance position. In various embodiments, the assist step 402 rotates clockwise and counterclockwise about a pivot point 430 located on an inboard end of the assist step 402 and adjacent to the linkage assembly 461. In the illustrated embodiment, the assist step 402 includes a channel edge defining an opening 413 configured to receive the panel 404 such that the panel 404 is recessed within the assist step 402 when the panel 404 is in the stowed position.

With continued reference to FIG. 13, in various embodiments, the panel 404 is deployable to the aerodynamic position when the assist step 402 is in the stowed position. In various embodiments, a movement mechanism 420, which may be a motor or other mechanical or electrical mechanism, translates the panel 404 from the stowed position to the aerodynamic position and vice versa, as shown in FIG. 13. In various embodiments, the movement mechanism 420 is in electronic communication with at least one controller, such as the controller 22.

In various embodiments, the panel 404 has different lengths and may have the same length or a different length from the assist step 402. When in the stowed position, the panel 404 is hidden from view of the customer such that the panel 404 does not affect vehicle styling and is protected from debris.

Figure 14:
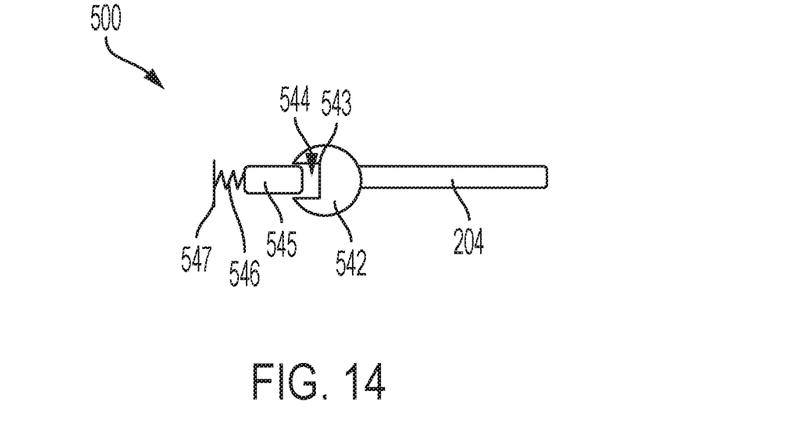
FIG. 14 is a schematic longitudinal side view of a break away feature for an aerodynamic member, according to an embodiment of the disclosure.

FIG. 14 illustrates a breakaway assembly 500, according to an embodiment. The breakaway assembly 500 may be used with any of the panels and assist step assemblies discussed herein. The breakaway assembly 500 includes a receiving member 542 coupled to a first end of the panel 204, that is, at the inboard end of the panel 204. The receiving member 542 includes an edge 543 defining an opening 544 configured to receive a connection member 545. In various embodiments, the connection member 545 is magnetically or mechanically removably coupled to the receiving member 542 using any type of quick disconnect connection means. In various embodiments, the connection member 545 is coupled to a compressible member 546. In some embodiments, the compressible member 546 is a spring. The compressible member 546 is also fixedly coupled to a fixed member 547 coupled to the linkage assembly. The compressible member 546 provides a spring-loaded feature to the breakaway assembly 500.

Upon application of pressure to the panel 204, such as interaction with ground debris or other obstacle, the connection member 545 disconnects from the receiving member 542. As a result, the panel 204 disconnects from the assist step assembly, such as the assist step assembly 200, thus preventing damage to the assist step assembly 200 and/or the vehicle body 12.

Figure 15:
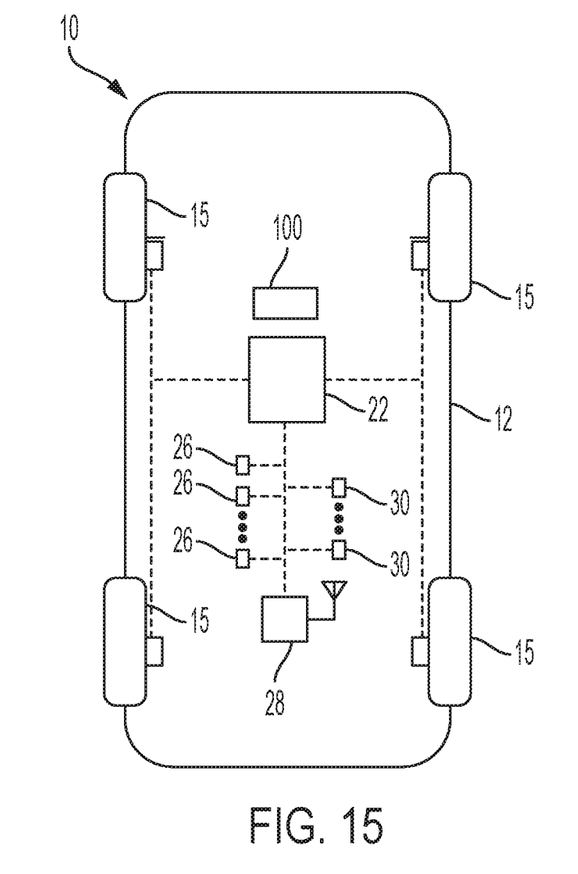
FIG. 15 is a schematic illustration of a vehicle including an assist step assembly, according to an embodiment of the disclosure.

FIG. 15 is a schematic system illustration of a vehicle 10 including an assist step assembly, such as any of the assist step assemblies discussed herein. The vehicle 10 includes various additional systems coupled with or in electronic communication with the assist step assembly, such as the controller 22, one or more vehicle sensors 26, and one or more actuators 30. The vehicle 10 is depicted in the illustrated embodiment as a passenger car, but it should be appreciated that any other vehicle, including motorcycles, trucks, sport utility vehicles (SUVs), or recreational vehicles (RVs), etc., can also be used.

The vehicle 10 generally includes the body 12 and wheels 15. The body 11 encloses the other components of the vehicle 10 and also defines a passenger compartment. The wheels 15 are each rotationally coupled to the vehicle body 12 near a respective corner of the vehicle body 12.

In various embodiments, the vehicle 10 also includes a wireless communication system 28 configured to wirelessly communicate with other vehicles ("V2V") and/or infrastructure ("V2I"). In an exemplary embodiment, the wireless communication system 28 is configured to communicate via a dedicated short-range communications (DSRC) channel. DSRC channels refer to one-way or two-way short-range to medium-range wireless communication channels specifically designed for automotive use and a corresponding set of protocols and standards. However, wireless communications systems configured to communicate via additional or alternate wireless communications standards, such as IEEE 802.11 and cellular data communication, are also considered within the scope of the present disclosure.

The controller 22 of the vehicle 10 is in electronic communication with the assist step assembly, such as the assist step assembly 200, and is configured to generate one or more control signals to control the position of the assist step and/or the panel. Additionally, one or more vehicle sensors 26 generate data on vehicle characteristics, such as vehicle speed, acceleration/deceleration, detected obstacles, etc., for example and without limitation. The controller 22 receives data from the one or more vehicle sensors 26 and analyzes the sensor data to generate the control signals that are transmitted to the assist step assembly. Additionally, the controller 22 is in electronic communication with one or more actuators 30. The one or more actuators 30 are configured to control various aspects of the vehicle 10 and the linkage assemblies discussed herein, including deployment of the panel, deployment of the assist step, retraction and stowing of the assist step, and retraction and stowing of the panel, for example and without limitation.

Figure 16:
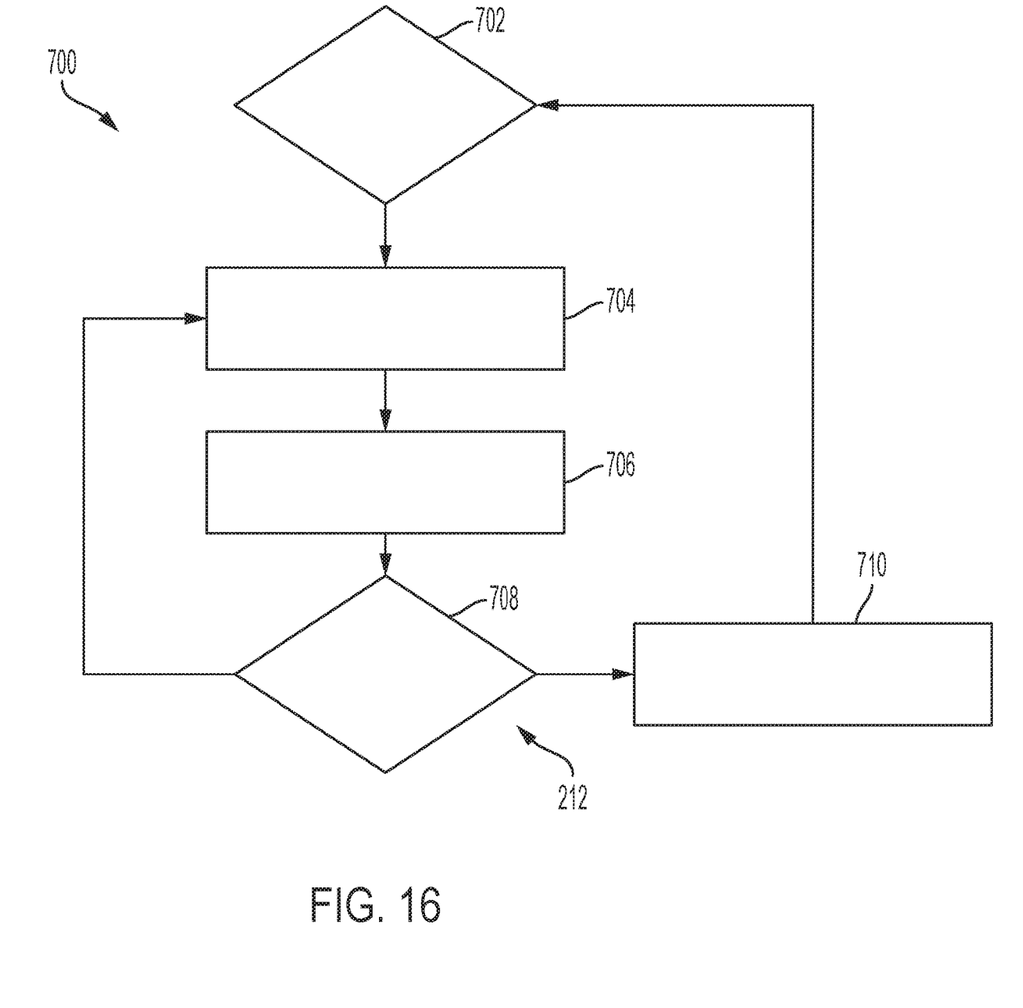
FIG. 16 is a flow chart diagram of a method to control an assist step assembly, according to an embodiment of the disclosure.

FIG. 16 illustrates a method 700 to control an adjustable assist step and aerodynamic member of a vehicle. The method 700 can be utilized in connection with any of the assist step assemblies discussed herein. The method 700 can be utilized in connection with the controller 22 as discussed herein, or by other systems associated with or separate from the vehicle, in accordance with exemplary embodiments. The order of operation of the method 700 is not limited to the sequential execution as illustrated in FIG. 16, but may be performed in one or more varying orders, or steps may be performed simultaneously, as applicable in accordance with the present disclosure.

The method 700 begins at 702, wherein a controller, such as the controller 22, determines a first vehicle operating condition. In various embodiments, the first vehicle operating condition is satisfied when the vehicle speed, as determined by one of the sensors 26, is above a threshold speed.

If the first vehicle operating condition is not satisfied, that is, the vehicle speed is not above the threshold speed, the method 700 does not advance and the controller 22 continues to receive and analyze vehicle sensor data received from the one or more sensors 26.

If the first vehicle operating condition is satisfied, that is, the vehicle speed is above the threshold speed, the method 700 proceeds to 704. At 704, the controller 22 generates one or more control signals to deploy the aerodynamic member, such as the panel 204 of the assist step assembly 200, to an aerodynamic position.

From 704, the method 700 proceeds to 706. At 706, the controller 22 receives sensor data from the one or more vehicle sensors 26 and analyzes the data at a periodic or continuous rate. Next, at 708, the controller 22 determines whether a retraction or stowing condition is satisfied. In various embodiments, a retraction condition is satisfied when a drive mode, ambient temperature, vehicle location, or other sensor data indicate that retraction or stowing of the aerodynamic member is desired. In various embodiments, sensor data may include data regarding detected obstacles in the path of the vehicle.

If the retraction condition is not satisfied, the method 700 returns to 704 and the controller 22 continues to monitor the vehicle sensor data. If the retraction condition is satisfied, the method 700 proceeds to 710 and the controller 22 generates one or more control signals to retract the assist step and/or panel of the assist step assembly into a retracted position. The method 700 then returns to 702.

In various embodiments, the controller 22 is configured to determine whether one or more vehicle operating conditions indicate that one or more components of the assist step assembly, such as the assist step 202 and the panel 204, should be deployed or stowed. Additionally, in various embodiments, the controller 22 is configured to determine whether one or more vehicle operating conditions indicate that actuation of the panel 204 of the assist step assembly should be prevented or delayed, such as when an obstacle is detected, for example and without limitation.

In various embodiments, the method 700 begins with the assist step 202 in the stowed position, with the controller 22 configured to monitor vehicle sensor data to determine when a vehicle operating condition, such as a vehicle speed, is above the threshold speed, and in response, to deploy the aerodynamic member or the assist step to an aerodynamic position to reduce vehicle drag. In various embodiments, as discussed herein, the aerodynamic member is deployed to the aerodynamic position independent of the assist step, that is, the assist step remains in the deployed position while the aerodynamic member is deployed to the aerodynamic position when vehicle operating conditions are satisfied.

It should be emphasized that many variations and modifications may be made to the herein-described embodiments, the elements of which are to be understood as being among other acceptable examples. All such modifications and variations are intended to be included herein within the scope of this disclosure and protected by the following claims. Moreover, any of the steps described herein can be performed simultaneously or in an order different from the steps as ordered herein. Moreover, as should be apparent, the features and attributes of the specific embodiments disclosed herein may be combined in different ways to form additional embodiments, all of which fall within the scope of the present disclosure.

Conditional language used herein, such as, among others, "can," "could," "might," "may," and the like, unless specifically stated otherwise, or otherwise understood within the context as used; is generally intended to convey that certain embodiments include, while other embodiments do not include, certain features, elements and/or Mates. Thus, such conditional language is not generally intended to imply that features, elements and/or states are in any way required for one or more embodiments or that one or more embodiments necessarily include logic for deciding, with or without author input or prompting, whether these features, elements and/or states are included or are to be performed in any particular embodiment.

Moreover, the following terminology may have been used herein. The singular forms "a," "an," and "the" include plural referents unless the context clearly dictates otherwise. Thus, for example, reference to an item includes reference to one or more items. The term "ones" refers to one, two, or more, and generally applies to the selection of some or all of a quantity. The term "plurality" refers to two or more of an item. The term "about" or "approximately" means that quantities, dimensions, sizes, formulations, parameters, shapes and other characteristics need not be exact, but may be approximated and/or larger or smaller, as desired, reflecting acceptable tolerances, conversion factors, rounding off, measurement error and the like and other factors known to those of skill in the art. The term "substantially" means that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

A plurality of items may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary. Furthermore, where the terms "and" and "or" are used in conjunction with a list of items, they are to be interpreted broadly, in that any one or more of the listed items may be used alone or in combination with other listed items. The term "alternatively" refers to selection of one of two or more alternatives and is not intended to limit the selection to only those listed alternatives or to only one of the listed alternatives at a time, unless the context clearly indicates otherwise.

The processes, methods, or algorithms disclosed herein can be deliverable to/implemented by a processing device, controller, or computer, which can include any existing programmable electronic control unit or dedicated electronic control unit. Similarly, the processes, methods, or algorithms can be stored as data and instructions executable by a controller or computer in many forms including, but not limited to, information permanently stored on non-writable storage media such as ROM devices and information alterably stored on writeable storage media such as floppy disks, magnetic tapes, CDs, RAM devices, and other magnetic and optical media. The processes, methods, or algorithms can also be implemented in a software executable object. Alternatively, the processes, methods, or algorithms can be embodied in whole or in part using suitable hardware components, such as Application Specific Integrated Circuits (ASICs), Field-Programmable Gate Arrays (FPGAs), state machines, controllers or other hardware components or devices, or a combination of hardware, software and firmware components. Such example devices may be on-board as part of a vehicle computing system or be located off-board and conduct remote communication with devices on one or more vehicles.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further exemplary aspects of the present disclosure that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and can be desirable for particular applications.

What is claimed is:

1. An assist step assembly, comprising:
a linkage assembly including a first linkage member and a second linkage member, a pin extending longitudinally through a portion of each of the first linkage member and second linkage member, and a rotating member configured to engage with the pin such that a rotation of the rotating member in a first direction prevents retraction of the pin from the second linkage member, and a rotation of the rotating member in a second direction allows retraction of the pin from the second linkage member;
an assist step coupled to the linkage assembly and movable between a first assist step position and a second assist step position;
an aerodynamic member coupled to the linkage assembly and movable from a first aerodynamic member position to a second aerodynamic member position;
a movement mechanism coupled to the aerodynamic member and configured to move the aerodynamic member between the first aerodynamic member position and the second aerodynamic member position; and
a controller in electronic communication with the movement mechanism, the controller configured to determine an operating condition, determine a position of the assist step based on the operating condition, and generate one or more control signals to move the aerodynamic member between the first aerodynamic member position and the second aerodynamic member position.

2. The assist step assembly of claim 1, wherein the first assist step position is a stowed position and the second assist step position is a passenger assistance position.

3. The assist step assembly of claim 2, wherein in the passenger assistance position, the assist step is oriented horizontally and the assist step is further movable to an aerodynamic position in which the assist step is oriented vertically.

4. The assist step assembly of claim 3, wherein the second linkage member comprises a first inboard linkage member and a second inboard linkage member connected in serial such that the first and second inboard linkage members fold and rotate relative to each other to position the assist step in the aerodynamic position.

5. The assist step assembly of claim 1, wherein the aerodynamic member is rotatably coupled to the assist step and independently actuatable from the assist step.

6. The assist step assembly of claim 1, wherein the first aerodynamic member position is a stowed position and the second aerodynamic member position is a deployed position and when the aerodynamic member is in the deployed position, the aerodynamic member extends in a vertical plane.

7. The assist step assembly of claim 1, wherein the assist step further includes a recession configured to receive the aerodynamic member when the aerodynamic member is in a stowed position.

8. The assist step assembly of claim 1, wherein the aerodynamic member is linearly actuated between the first aerodynamic member position and the second aerodynamic member position.

9. The assist step assembly of claim 1, wherein the aerodynamic member is coupled to an inboard end of the assist step and is rotatably actuated between the first aerodynamic member position and the second aerodynamic member position.

10. An assist step assembly, comprising:
a linkage assembly including a first linkage member, a second linkage member oriented parallel to the first linkage member, a first guide member, and a second guide member;
an assist step coupled to the linkage assembly and movable between a first assist step position and a second assist step position;
an aerodynamic member coupled to the linkage assembly, wherein the aerodynamic member is movable between a first aerodynamic member position and a second aerodynamic member position;
a movement mechanism coupled to the aerodynamic member and configured to move the aerodynamic member between the first aerodynamic member position and the second aerodynamic member position;
a controller in electronic communication with the movement mechanism, the controller configured to determine an operating condition, determine a position of the assist step based on the operating condition, and generate one or more control signals to move the aerodynamic member between the first aerodynamic member position and the second aerodynamic member position; and
a breakaway assembly coupled to the linkage assembly and the assist step, the breakaway assembly including a receiving member, a connection member, and a compressible member, the receiving member being coupled to a first end of the assist step, wherein the receiving member includes an edge defining an opening configured to receive a first end of the connection member, a second end of the connection member is coupled to the compressible member, and the connection member is removably coupled to the receiving member.

11. The assist step assembly of claim 10, wherein the first assist step position is a stowed position and the second assist step position is a passenger assistance position.

12. The assist step assembly of claim 10, wherein the aerodynamic member is independently actuatable from the assist step.

13. The assist step assembly of claim 10, wherein the first aerodynamic member position is a stowed position and the second aerodynamic member position is a deployed position and when the aerodynamic member is in the deployed position, the aerodynamic member extends in a vertical plane.

14. The assist step assembly of claim 13, wherein the aerodynamic member is positioned inboard of and flush with the linkage assembly when the aerodynamic member is in the stowed position.

15. The assist step assembly of claim 13, wherein the first and second guide members are tracks and the aerodynamic member translates between the stowed position and the deployed position along the first and second guide members.

16. A method to control a position of an aerodynamic member of a vehicle, comprising:
providing an assist step assembly including a linkage assembly having a first linkage member and a second linkage member, an assist step coupled to the linkage assembly, and an aerodynamic member coupled to the linkage assembly and independently actuatable from the assist step, the linkage assembly having a pin extending longitudinally through a portion of each of the first linkage member and the second linkage member, and a rotating member configured to engage with the pin such that a rotation of the rotating member in a first direction prevents retraction of the pin from the second linkage member, and a rotation of the rotating member in a second direction allows retraction of the pin from the second linkage member;

providing a controller in electronic communication with the assist step assembly;

determining, by the controller, when a vehicle speed is above a predetermined threshold; and when the vehicle speed is above the predetermined threshold, generating, by the controller, a control signal to deploy the aerodynamic member to an aerodynamic position independent of a stowed position of the assist step.

17. The method of claim 16, wherein the method is initiated when the assist step is in the stowed position.

18. The method of claim 16 further comprising determining, by the controller, when an obstacle is detected in the path of the vehicle and generating, by the controller, a control signal to retract the aerodynamic member to a stowed position when the obstacle is detected.

19. The method of claim 16 further comprising:

coupling a breakaway assembly coupled to the linkage assembly and to the assist step, the breakaway assembly including a receiving member, a connection member, and a compressible member;

coupling the receiving member to a first end of the assist step, wherein the receiving member includes an edge defining an opening configured to receive a first end of the connection member;

coupling a second end of the connection member to the compressible member; and removably coupling the connection member to the receiving member.

* * * * *